United States Patent [19]
Walther et al.

[11] 3,787,076
[45] Jan. 22, 1974

[54] FIFTH WHEEL COUPLER ASSEMBLY

[75] Inventors: William D. Walther, Dayton; Robert A. Deregnaucourt, Centerville, both of Ohio

[73] Assignee: The Dayton Steel Foundry Company, Dayton, Ohio

[22] Filed: Apr. 11, 1972

[21] Appl. No.: 242,948

[52] U.S. Cl. .............................................. 280/435
[51] Int. Cl. ........................................... B62d 53/12
[58] Field of Search .................... 280/434, 435, 437

[56] References Cited
UNITED STATES PATENTS

| | | | |
|---|---|---|---|
| 3,647,248 | 3/1972 | Ferris et al. | 248/119 X |
| 3,640,549 | 2/1972 | Neff et al. | 280/435 R |
| 3,442,533 | 5/1969 | Walther | 280/435 R |
| 2,982,566 | 5/1961 | Geerds | 280/435 R |

Primary Examiner—Leo Friaglia
Assistant Examiner—Randall A. Schrecengost
Attorney, Agent, or Firm—Mack D. Cook, II

[57] ABSTRACT

A fifth wheel coupler assembly having dual opposed coupling jaws pivotally mounted beneath the top plate on opposite sides of the kingpin slot. A latch mechanism is carried beneath the top plate and includes a plunger block movable longitudinally of the kingpin slot and spring-biased so as to be inserted between opposed and parallel faces on the forward end of the dual coupling jaws to lock the jaws in a kingpin engaging position. A sensor arm projects into the slot when the assembly is in open or kingpin receiving condition and has an orientation such that the plunger block will not release if the kingpin is in a position so as not to correctly engage with the coupling jaws.

1 Claim, 5 Drawing Figures

FIFTH WHEEL COUPLER ASSEMBLY

BACKGROUND OF THE INVENTION

The invention relates to a fifth wheel coupler assembly carried on the tractor to engage a kingpin on a trailer. More particularly, the invention relates to a fifth wheel coupler assembly carried on the tractor having a locking mechanism which should be actuated only when the kingpin is properly positioned.

The prior art has many forms of fifth wheel coupler assemblies. U.S. Pat. No. 3,358,955, patented December/1967 to Pullman, Inc., discloses a foldable stanchion for use in hitching a trailer on a railway flat car and movable from a collapsed storing position on the car to an erect operative position forming a substantially triangular port. The stanchion has a fifth wheel plate and a locking mechanism for locking a rotating kingpin receiving jaw in a closed position. U.S. Pat. No. 3,647,248, patented March/1972 to Pullman, Inc., discloses a locking means combined with an actuating mechanism which prevents the locking means from entering into a locked relation with respect to the jaw means if the kingpin is not properly seated or located.

The present invention is to improve a "dual-jaw" coupler assembly as disclosed in U.S. Pat. No. 3,442,533, patented May/1969 to the Dayton Steel Foundry Company.

From the disclosure of U.S. Pat. No. 3,647,248, and according to the knowledge of the present inventors, it is known that the orientation of the kingpin during coupling is extremely critical. If the kingpin does not enter the kingpin slot in the correct orientation plane, the locking mechanism plunger block should not be released, to engage the coupling jaw. Otherwise, there could be "false coupling" and miscoupling or accidental droppage of the trailer during movement over the highway.

SUMMARY OF THE INVENTION

The object of the invention is to provide an improved fifth wheel coupler assembly.

It is a further object of the invention to provide a fifth wheel coupler assembly having dual opposed coupling jaws which will not close if the orientation plane of the kingpin during coupling is not correct or too high.

A still further object of the invention is to provide a fifth wheel coupler assembly with a sensor arm such that the coupling jaws will not close if the kingpin is in a position so as not to correctly engage with the coupling jaws.

These and other objects of the invention, and the advantages thereof, will be apparent in view of the Description of a Preferred Embodiment as set forth below.

In general, a coupler assembly according to the invention is used with a fifth wheel mounted on a tractor and having a top plate with a longitudinally directed kingpin slot opening to the rear. Dual opposed coupling jaws are pivotally mounted beneath the top plate to rotate into the kingpin slot and engage the kingpin on a trailer. A latch mechanism carried beneath the top plate includes a plunger block movable longitudinally of the kingpin slot and spring-biased so as to be inserted between opposed and parallel forces on the forward end of the dual coupling jaws locking the jaws closed.

A coupler assembly according to the invention is characterized in that a sensor arm projects into the kingpin slot when the assembly is in the open or kingpin receiving condition and has a orientation such that the plunger block of the latch mechanism will not release if the kingpin is in a plane so as not to correctly engage with the coupling jaws.

DETAILED DESCRIPTION OF THE INVENTION

Figure 1:
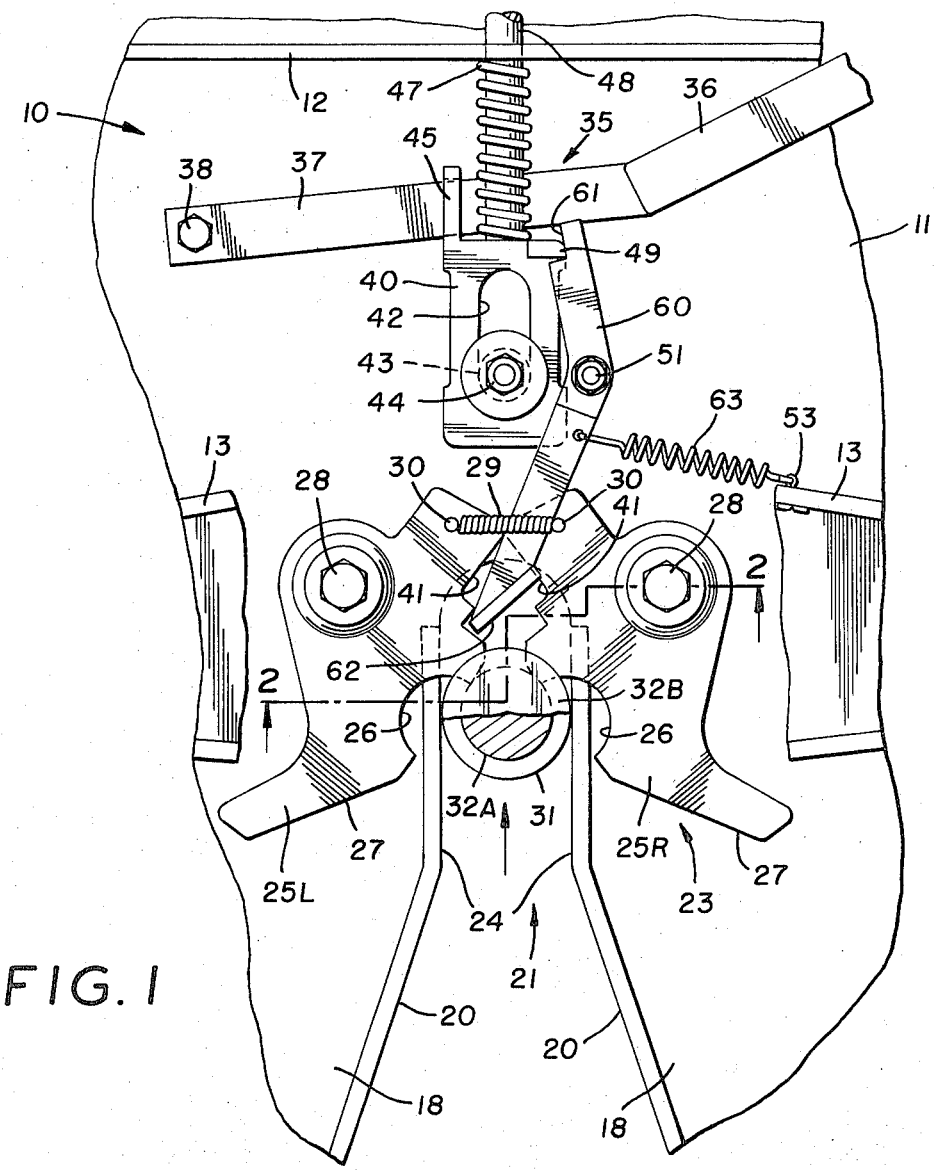
FIG. 1 is a fragmentary plan view of an improved fifth wheel according to the invention, with the dual coupler jaws in an open or kingpin receiving condition.

The fifth wheel coupler assembly, represented generally by the numeral 10, is incorporated in a fifth wheel having a top plate 11 of conventional shape with a peripheral flange 12 and strengthening webs 13. As shown in said prior U. S. Pat. No. 3,442,533, the top plate 11 is secured to the rear platform of a tractor by a pair of depending bosses pivotally connected to supporting brackets. In the area between the supporting brackets and strengthening webs 13, the underside of the top plate 11 has a dependant underhousing which protects and provides support for the several operating elements described below.

As also disclosed in said prior U. S. Pat. No. 3,442,533, the rear portion of the top plate has rearwardly divergent leg portions 18 the inner edges 20 of which define the guide opening 21 adapted to guide a kingpin into engagement with the coupler indicated generally by the numeral 23.

The jaws of the kingpin coupler 23 are pivotally mounted within underhousing so as to rotate horizontally into the longitudinally directed medial or kingpin slot 24 communicating with the guide opening 21. As shown, the kingpin coupler 23 has dual or bifurcated opposed coupling jaws 25L and 25R with complementary arcuate clamping surfaces 26 adapted to partially surround or engage the kingpin and rearwardly projecting cam edges 27. Each coupler jaw 25 pivots on a pin 28 extending between top plate 11 and underhousing and is biased to rotate the cam edges 27 forwardly assuming the open position shown in FIG. 1 by a strong tension spring 29 connected between a depending pin 30 on the forward end of each coupler jaw.

Figure 2:
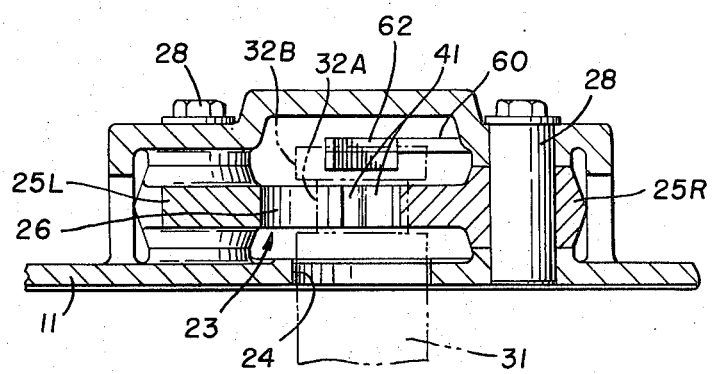
FIG. 2 is a fragmentary view taken substantially as indicated on line 2—2 of FIG. 1, particularly showing the sensor arm projecting into the kingpin slot.
Figure 4:
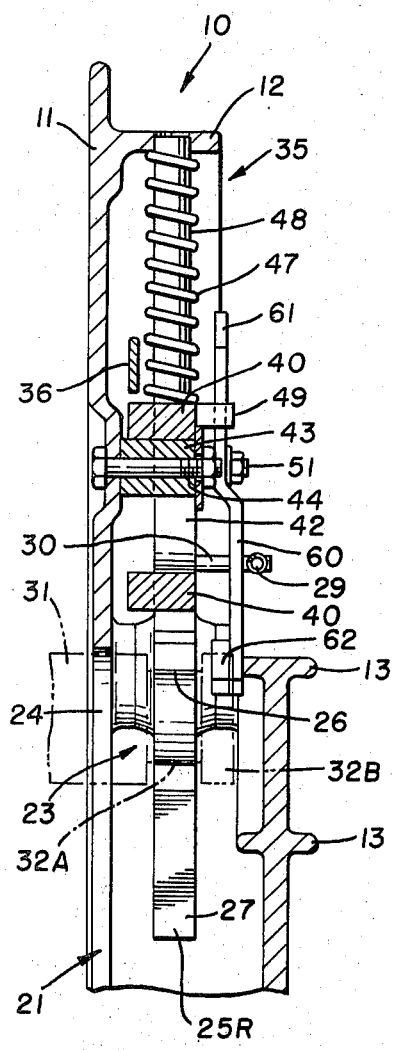
FIG. 4 is a fragmentary view taken substantially as indicated on line 4—4 of FIG. 2.
Figure 3:
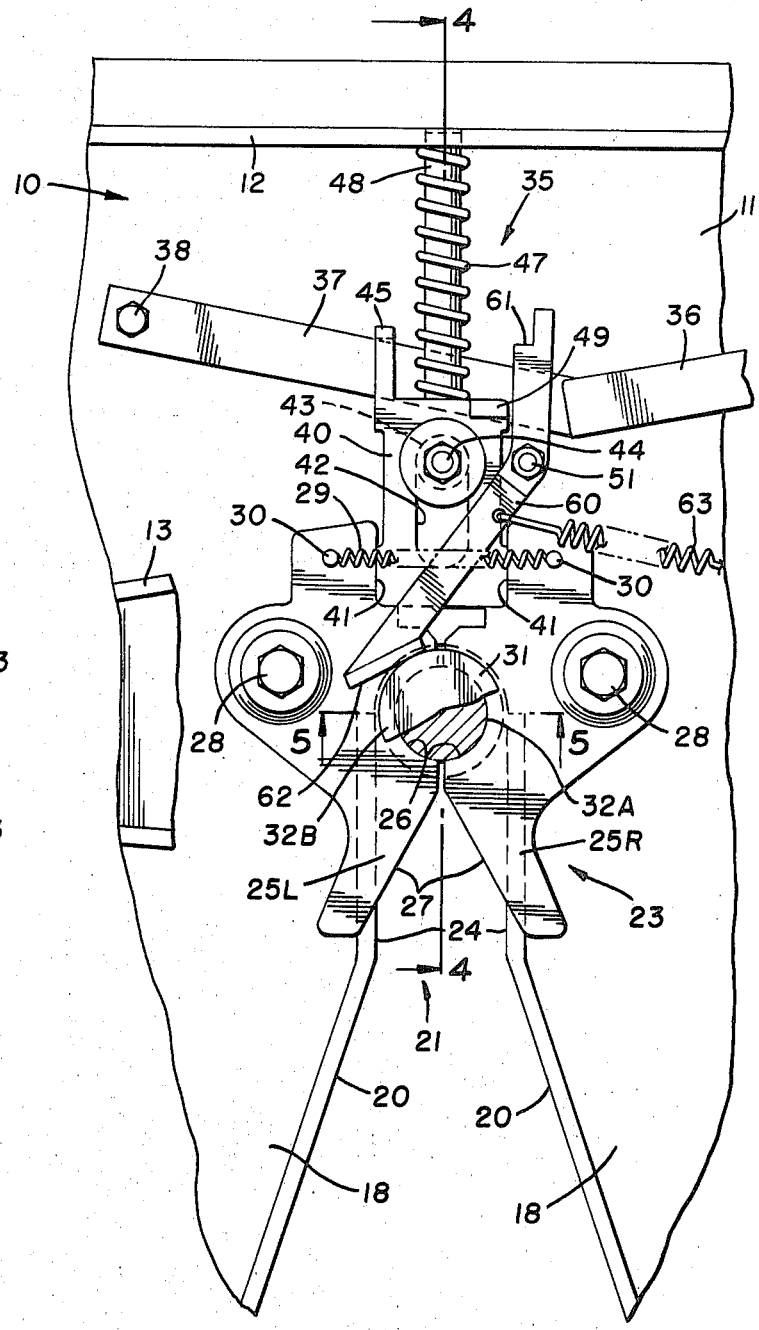
FIG. 3 is a view similar to FIG. 1, with the dual coupler jaws in a closed or kingpin engaging condition.
Figure 5:
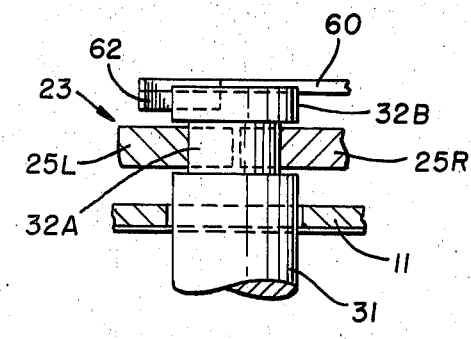
FIG. 5 is a fragmentary view taken substantially as indicated on line 5—5 of FIG. 3.

As best seen in FIG. 2, the kingpin 31 attached to the trailer (not shown) has a recessed intermediate or neck portion 32A closely surrounded or engaged by the clamping surfaces 26 of the coupler jaws when the coupler 23 is closed. Below the medial surface 32A, the kingpin 31 has a larger diameter portion 32B. The coupler 23 is maintained in the closed condition by a latch mechanism indicated generally by the numeral 35.

The coupler latch mechanism 35 is carried beneath the top plate 11 and includes a lever 36 having an inner end 37 movably fastened as by a bolt and nut 38. The outer end of the lever 36 extends to the side of the fifth wheel to form a handle for actuating the latch mechanism.

The coupler jaws 25 are locked in the closed position by a sliding plunger block 40 which moves between opposed parallel surfaces 41 on the forward end of each coupler jaw. The plunger block 40 has an elongated slot 42 enclosing a guide stud 43 depending from the top plate 11 and securely fastened as by a lock nut and washer assembly 44. The plunger block 40 also has a forwardly extending ear flange 45 for insertion of the medial portion of latch lever 36 therethrough. The plunger block 40 is normally biased toward the coupler jaws 25 by a strong compression spring 47 mounted around a plunger block rod 48 slidably mounted in a suitable bore in the flange 12. The plunger block 40 has a downwardly extending latch dog 49.

As shown in said prior U.S. Pat. No. 3,442,533, when the plunger block 40 is retracted by forward movement of the latch lever 36, means are provided to render the plunger block 40 inoperative or held out of contact with the coupler jaws 25 until the trailer is completely uncoupled from the fifth wheel and coupler assembly 10. Such means comprises a cooperative lock or latch bar (not shown) rotatably fastened to the top plate by a bolt lock nut and washer assembly 51. The forward end of the latch bar is squared so as to engage the latch dog 49 when the plunger block 40 is retracted. The inner end of the latch bar is preferably tapered, so as to slidingly engage a suitable mating surface on the underside of coupling jaw 25R, such as to pin 30. A tension spring (not shown) may be connected between a flange 13 on the underhousing and the midpoint of the latch bar so as to cause the end of the latch bar to always be tending to rotate into engagement with the latch dog 49.

The functional purpose of the latch bar, to hold the plunger block 40 out of contact with the coupler jaws 25 until the trailer is completely uncoupled, is fulfilled as the kingpin 31 moves out of the slot 21 during uncoupling. The opening of the jaws 25L and 25R will move the pin 30 on jaw 25R into sliding engagement with the rearward end of the latch bar which will disengage the latch bar from the latch dog 49 and the plunger block 40 will be normally biased toward the coupling jaws 25L and 25R.

However, the improved fifth wheel coupler assembly 10 includes a sensor arm 60 which projects into the slot 21 when the assembly 10 is in the open or kingpin receiving condition and which restricts movement of the plunger block 40 toward the coupling jaws 25L and 25R.

The sensor arm 60 has an orientation such that the plunger block 40 of the latch mechanism 35 will not release if the kingpin 31 is in a plane so as not to correctly engage with the surfaces 26 of the jaws 25L and 25R.

As shown, the sensor arm 60 is an elongated element, and is rotatably fastened at one side of the plunger block 40 by the bolt, lock nut and washer assembly 51. The forward or end of the arm 60 is notched as at 61 so as to engage the latch dog 49 extending downwardly from the forward portion of the plunger block 40, when the plunger block 40 is retracted as by movement of the lever arm 36. The rearward or outer end of the sensor arm 60 is directed from fastening point 51 diagonally inward so as to terminate in an actuator flange 62 positioned within the slot 21 so as to contact the enlarged diameter lower portion 32B of the kingpin 31. A means such as a tension spring 63 is connected as at 53 between a flange 13 and the midpoint of the sensor bar 60 so as to cause the sensor bar to always be tending to rotate into engagement with the latch dog 49.

Prior to coupling, the tractor operator will "set" the coupler assembly 10 by moving the lever arm 36 in a forward direction when the tractor was uncoupled from the previously coupled trailer. This will leave the coupling jaws 25L and 25R in the kingpin receiving position but will retract the plunger block 40 sufficient to cause the sensor arm notch 61 to engage the latch dog 49. Thereafter, as the tractor is moved toward the trailer, the sensor arm actuator 62 is located or positioned to engage the lower flange 32B of the kingpin 31 when coupling. If the kingpin does not enter at the correct height, the sensor arm notch 61 will not disengage from the latch dog 49 and the plunger block 40 will not release to lock the coupling jaws. This is an important safety feature that eliminates "false" coupling.

What is claimed is:

1. A coupler assembly for a fifth wheel mounted on a tractor and having a top plate with a longitudinally directed kingpin slot, a coupler having dual opposed coupling jaws pivotally mounted beneath said top plate to rotate into the kingpin slot and engage the kingpin on a trailer, a latch mechanism carried beneath said top plate and including a plunger block movable longitudinally of the kingpin slot and spring-biased so as to be inserted between opposed and parallel faces on the forward end of the dual coupling jaws for locking the jaws closed and, a sensor arm projecting into the kingpin slot when the assembly is in the open or kingpin receiving condition and having an orientation such that said longitudinally movable plunger block of the latch mechanism will not release if the kingpin is in a plane so as not to correctly engage with the coupling jaws, characterized in that, said plunger block has a latch dog extending downwardly therefrom and said sensor arm is an elongated element rotatably fastened at one side of the plunger block, the forward end of said sensor arm being notched so as to engage said latch dog, the rearward end of said sensor arm being directed from said point of rotatable fastening diagonally inward so as to terminate in an actuator flange positioned within said slot, there being means connected to said sensor bar so as to cause said sensor bar to be always tending to rotate into engagement with the latch dog.

* * * * *